(No Model.)
G. W. & F. P. MURPHEY.
REEL FOR CHECK ROW WIRES.
No. 286,218.   Patented Oct. 9, 1883.
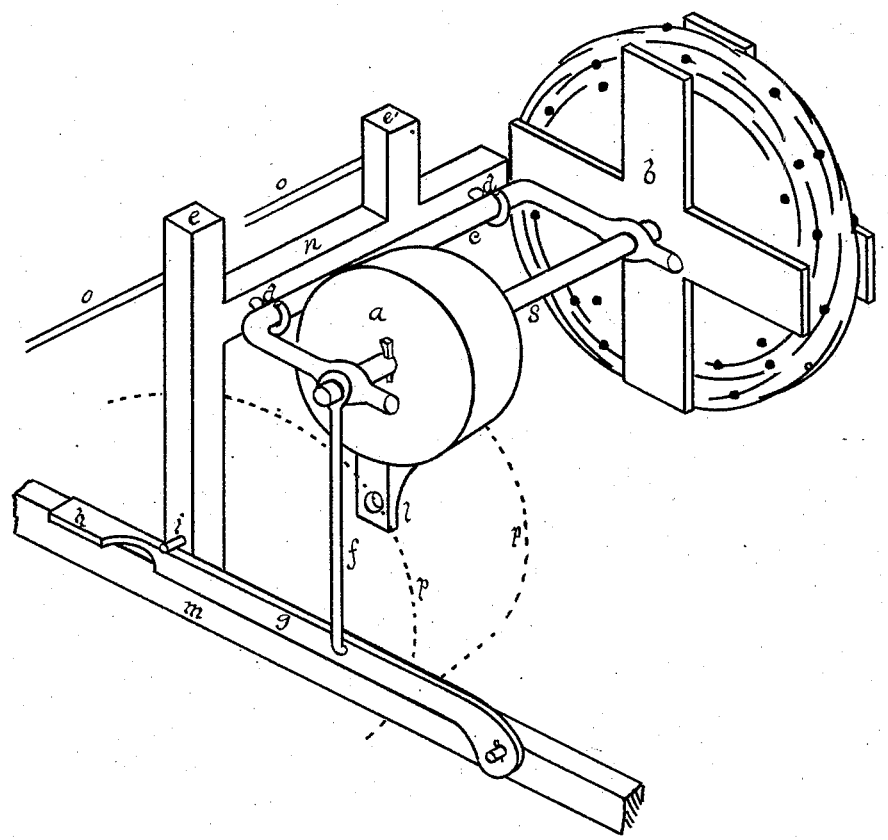
Witnesses
Frank Remley
Will. Ermentraut
Inventors
George W. Murphey
Frank P. Murphey
By L. P. Graham
attorney.

United States Patent Office.

GEORGE W. MURPHEY AND FRANK P. MURPHEY, OF KENNEY, ILLINOIS.

REEL FOR CHECK-ROW WIRE.

SPECIFICATION forming part of Letters Patent No. 286,218, dated October 9, 1883.

Application filed October 13, 1882. (No model.)

*To all whom it may concern:*

Be it known that we, GEORGE W. MURPHEY and FRANK P. MURPHEY, residents of the town of Kenney, county of De Witt, and State of Illinois, have invented certain new and useful Improvements in Reels for Check-Row Wire, of which the following is a specification.

Our invention consists in a vertical frame astride a planter-wheel, a horizontal swinging frame secured to the vertical frame in a detachable manner, a friction-pulley over the planter-wheel, and a reel on a line with the end of the check-row bar.

Our invention also consists in a foot-lever, pin, and connecting-rod, that operate with the swinging frame to regulate the pressure of the friction-pulley on the planter-wheel.

The object of our invention is to produce a reel for check-row wire that may be readily attached to or detached from a corn-planter, and by means of which the check-rower may be operated and corn planted while laying down and taking up the wire.

In our device the frame that carries the reel is set astride a corn-planter wheel and attached to and braced from the planter-frame. A friction-pulley and the reel, both on one shaft in a detachable frame, are swung to the rigid frame above mentioned. The friction-pulley is located over the planter-wheel, and a rod extending from the shaft down to a foot-lever regulates the contact between said wheel and pulley. The wire is made to reel up by the motion of the planter-wheel, and the same motion is used to regulate the tension of the wire while unreeling.

The drawing accompanying and forming a part of this specification represents our device as seen from the rear when attached to the right wheel of a corn-planter.

$a$ is a friction-pulley rigid on shaft $s$. $b$ is the reel, rigid on the same shaft. $e$ $e'$ are uprights located one on each side of the planter-wheel, as indicated by dotted lines $p$ $p$, $e$ being attached to the planter-frame and $e'$ to the end of the axle at $l$. $d$ $d$ are bearings for swinging frame $c$, so constructed that said frame may be readily detached. $g$ is a foot-lever pivoted to planter-frame $m$ and connected with shaft $s$ by rod $f$. $n$ is a cross-beam on uprights $e$ $e'$, to which the swinging frame $c$ is attached. $o$ $o$ are braces that connect with the planter-frame in front of the wheel. $i$ is a pin, on which lever $g$ rests while supporting the pulley from contact with the wheel of the planter.

In unreeling, the pulley is permitted to rest on the wheel to regulate the tension of the wire. In reeling up, the pulley is held against the wheel by pressure on treadle $h$ of lever $g$. When the tension becomes too strong, either in reeling or unreeling, the pulley will slip on the wheel.

By means of a pulley attached to the planter in front of the check-rower planting may be accomplished while laying the wire, and the wire may be reeled up through the check-rower, thereby obviating the necessity of an extra trip across the field for the sole purpose of taking up the wire.

When the reel is not in use, the lever $g$ may rest on pin $i$, thereby keeping the pulley from contact with the wheel; or the reel and pulley may be detached by disconnecting rod $f$ from lever $g$ and raising frame $c$ out of supports $d$ $d$.

We are aware that hose-reels provided with a pivoted bearing and operated by frictional contact with the supporting-wheels have been described by G B. Leonard in Patent No. 232,136, dated September 14, 1880, and that check-row-wire reels operated from the planter-wheel by an endless cord have been described by C. G. Cross in Patent No. 210,998, dated December 17, 1878, and we do not claim such devices, broadly; but,

Having thus described our invention, we claim as new and desire to secure by Letters Patent—

1. The combination, in a detachable reel that takes up and lays down wire while the same is operating a check-rower, of vertical frame $e$ $e'$ $n$, swinging frame $c$, pulley $a$, and reel $b$, all constructed and arranged substantially as shown and described.

2. The combination, with frames $e$ $e'$ $n$ and $c$, pulley $a$, and reel $b$, of rod $f$, lever $g$, and treadle $h$, as and for the purpose set forth.

3. The combination, with frames $e$ $e'$ $n$ and $c$, pulley $a$, and reel $b$, of rod $f$, lever $g$, and pin $i$, as and for the purpose set forth.

GEO. W. MURPHEY.
     FRANK P. MURPHEY.

Attest:
 F. C. TAYLOR,
 A. M. SACKETT.